(12) United States Patent
Nguyen et al.

(10) Patent No.: US 12,713,021 B2
(45) Date of Patent: Aug. 18, 2026

(54) USAGE OF CODED SUBBLOCK FLAGS ALONG WITH TRANSFORM SWITCHING INCLUDING A TRANSFORM SKIP MODE

(71) Applicant: FRAUNHOFER-GESELLSCHAFT ZUR FOERDERUNG DER ANGEWANDTEN FORSCHUNG E.V., Munich (DE)

(72) Inventors: Hoang Tung Nguyen, Berlin (DE); Benjamin Bross, Berlin (DE); Jonathan Pfaff, Berlin (DE); Heiko Schwarz, Berlin (DE); Detlev Marpe, Berlin (DE); Thomas Wiegand, Berlin (DE)

(73) Assignee: Fraunhofer-Gesellschaft zur Förderung der angewandten Forschuhg e.V., Munich (DE)

( * ) Notice: Subject to any disclaimer, the term of this patent is extended or adjusted under 35 U.S.C. 154(b) by 0 days.

(21) Appl. No.: 18/863,268

(22) PCT Filed: May 5, 2023

(86) PCT No.: PCT/EP2023/061896
§ 371 (c)(1),
(2) Date: Nov. 5, 2024

(87) PCT Pub. No.: WO2023/213991
PCT Pub. Date: Nov. 8, 2023

(65) Prior Publication Data

US 2025/0317564 A1 Oct. 9, 2025

(30) Foreign Application Priority Data

May 6, 2022 (EP) .................................... 22172040

(51) Int. Cl.
*H04N 19/00* (2014.01)
*H04N 19/12* (2014.01)
(Continued)

(52) U.S. Cl.
CPC ........... *H04N 19/12* (2014.11); *H04N 19/167* (2014.11); *H04N 19/176* (2014.11); *H04N 19/198* (2014.11); *H04N 19/61* (2014.11)

(58) Field of Classification Search
CPC .... H04N 19/12; H04N 19/167; H04N 19/176; H04N 19/198; H04N 19/61; H04N 19/119; H04N 19/70; H04N 19/129
See application file for complete search history.

(56) References Cited

U.S. PATENT DOCUMENTS 11,122,290 B2 * 9/2021 Jang ..................... H04N 19/503
11,146,785 B2 * 10/2021 Zhang ................... H04N 19/52
(Continued)

FOREIGN PATENT DOCUMENTS

WO 2023213991 A1 11/2023

OTHER PUBLICATIONS

Browne, A., et al., "Algorithm description for Versatile Video Coding and Test Model 15 (VTM 15)", No. m58420, Dec. 28, 2021 (Dec. 28, 2021), 136. MPEG Meeting; Oct. 11, 2021-Oct. 15, 2021; Online; (Motion Picture Expert Group or ISO/IEC JTC1/SC29/WG11), Retrieved from the Internet: URL:https://dms.mpeg.expert/doc_end_user/documents/136_Teleconference/wg11/m58420-JVET-X2002-v1-JVET-X2002-v1.zip JVET-X2002-v1.docx XP030302448 [retrieved on Dec. 28, 2021] sections 3.6.2, 3.6.3, 3.9.3.
(Continued)

*Primary Examiner* — Frank F Huang
(74) *Attorney, Agent, or Firm* — Conley Rose, P.C.

(57) ABSTRACT

The application of coded subblock flags is performed differently between the case of applying an identity transform
(Continued)

to a currently coded transform block on the one hand and applying a non-identity transform to the currently coded transform block on the other hand, in a manner yielding improved coding efficiency.

13 Claims, 7 Drawing Sheets

(51) Int. Cl.

| | |
|---|---|
| ***H04N 19/167*** | (2014.01) |
| ***H04N 19/176*** | (2014.01) |
| *H04N 19/196* | (2014.01) |
| *H04N 19/61* | (2014.01) |

(56) References Cited

U.S. PATENT DOCUMENTS

| | | | | |
|---|---|---|---|---|
| 11,159,816 | B2 * | 10/2021 | Liu | H04N 19/543 |
| 11,159,817 | B2 * | 10/2021 | Zhang | H04N 19/94 |
| 11,197,003 | B2 * | 12/2021 | Zhang | H04N 19/109 |
| 12,432,385 | B2 * | 9/2025 | Zhu | H04N 19/103 |
| 2018/0332289 | A1 * | 11/2018 | Huang | H04N 19/96 |
| 2019/0349587 | A1 * | 11/2019 | Jang | H04N 19/463 |
| 2019/0387241 | A1 * | 12/2019 | Kim | H04N 19/625 |
| 2020/0068195 | A1 * | 2/2020 | Yoo | H04N 19/117 |
| 2020/0177901 | A1 * | 6/2020 | Choi | H04N 19/176 |
| 2020/0177921 | A1 * | 6/2020 | Koo | H04N 19/61 |
| 2020/0374531 | A1 * | 11/2020 | Zhao | H04N 19/119 |
| 2021/0014534 | A1 * | 1/2021 | Koo | H04N 19/18 |
| 2021/0144376 | A1 * | 5/2021 | Tsukuba | H04N 19/139 |
| 2021/0211729 | A1 * | 7/2021 | Koo | H04N 19/18 |
| 2021/0218996 | A1 * | 7/2021 | Koo | H04N 19/176 |
| 2021/0306654 | A1 * | 9/2021 | Lee | H04N 19/176 |
| 2021/0321136 | A1 * | 10/2021 | Jung | H04N 19/119 |
| 2021/0368176 | A1 | 11/2021 | Bross | |
| 2022/0303542 | A1 * | 9/2022 | Paluri | H04N 19/46 |
| 2022/0368895 | A1 * | 11/2022 | Heo | H04N 19/46 |

OTHER PUBLICATIONS

Andersson, K., et al., "Fix for residual coding of transform skipped blocks", 102. MPEG Meeting; Oct. 15, 2012-Oct. 19, 2012; Shanghai; (Motion Picture Expert Group or ISO/IEC JTC1/SC29/WG11), No. m26583, Oct. 9, 2012 (Oct. 9, 2012), XP030054916, abstract, sections 3-5.

Sarwer (Alibaba-Inc) M G, et al., "AHG18: Residual coding method for lossless mode", No. JVET-P0463; m50431, Oct. 4, 2019 (Oct. 4, 2019), 16. JVET Meeting; Oct. 1, 2019-Oct. 11, 2019; Geneva; (The Joint Video Exploration Team of ISO/IEC JTC1/SC29/WG11 and ITU-T SG.16), Retrieved from the Internet: URL:http://phenix.int-evry.fr/jvet/doc_end_user/documents/16_Geneva/wg11/JVET-P0463-v3.zip JVET-P0463-v3.docx, XP030217382, [retrieved on Oct. 4, 2019].

* cited by examiner

FIG 3

USAGE OF CODED SUBBLOCK FLAGS ALONG WITH TRANSFORM SWITCHING INCLUDING A TRANSFORM SKIP MODE

CROSS-REFERENCE TO RELATED APPLICATIONS

This application is a filing under 35 U.S.C. 371 as the National Stage of International Application No. PCT/EP2023/061896, filed on May 5, 2023, entitled, "USAGE OF CODED SUBBLOCK FLAGS ALONG WITH TRANSFORM SWITCHING INCLUDING A TRANSFORM SKIP MODE," which claims the benefit of and claims priority to International European Application No. 22172040.2 filed on May 6, 2022 and entitled, "Concept for the Usage of Coded Subblock Flags Along With Transform Switching Including a Transform Skip Mode," both of which are incorporated herein by reference in their entirety for all purposes.

The present application is concerned with picture coding such as picture coding as a part of a video codec such as HEVC or VVC.

With increasing transform block sizes, codecs such as HEVC and VVC adopted the concepts of coding the transform blocks in a manner sub-divided into subblocks with certain syntax elements in the data stream, called coded subblock flags or the like, indicating whether a transform coefficient within the respective subblock are all zero or not, thereby allowing to skip the explicit coding of the transform coefficients of subblocks with coded subblock flags indicating the zeroness of all transform coefficients therein.

Additionally, codecs such as VVC allow for a selection among several transforms for coding a certain residual block, the transforms among which the selection is made including a transform skip mode according to which the resulting transform block relates to the spatial domain via an identity transform, i.e. the transform coefficients of the transform block are, in fact, residual samples.

According to VVC, a similar, but not identical concept is used in order to code the transform coefficients of transform blocks in the case of an identity transform on the one hand and in case of a non-identity transform on the other hand. The present application provides an efficient way of adapting the concept of the usage of coded subblock flags depending on the transform selected for the currently coded transform block.

It is the object of the present invention to provide a more efficient video codec.

This object is achieved by the subject-matter of the independent claims.

Some implementations of the present disclosure make efficient use of coded subblock flags and transform switching between transforms including an identity transform.

Some implementations of the present disclosure may involve the coding (i.e., encoding and/or decoding) of significance flags for transform coefficients. In general, a significance flag may indicate whether a corresponding transform coefficient is zero or not. On a decoder side, the significance flags may be scanned, and depending on whether or not a significance flag is available and/or depending on a value of the significance flag, the associated transform coefficient may be decoded and/or inferred. Other than the significance flags, the transform coefficients may not need to be decoded as such on the decoder side but can be inferred from associated significance flag values. For example, if a significance flag is inferred to be zero, then the corresponding transform coefficient may also be inferred to be zero, albeit indirectly (e.g., without decoding).

In some implementations of the present disclosure the application of coded subblock flags should be performed differently between the case of applying an identity transform to a currently coded transform block on the one hand and applying a non-identity transform to the currently coded transform block on the other hand. In particular, in case of applying a non-identity transform, the non-zero transform coefficients tend to get narrower in number and the area populated by these non-zero transform coefficients tends to get more compact so that the coding of a predetermined transform coefficient's position makes sense, wherein all transform coefficients, if any, preceding this predetermined transform coefficient in scan order, may inferred to be zero by the decoder. In such a scenario, for example, the significance flags corresponding to the preceding transform coefficients may be inferred first to infer values of particular transform coefficients corresponding to the preceding transform coefficients. In the identity transform case, the coding of such position does not make sense as the transform coefficients are, in fact, samples in spatial domain and the non-zero transform coefficients are, statistically, evenly spread across the transform block which is a block in spatial domain due to the identity transform. Accordingly, the idea is to treat certain subblocks differently in case of a non-identity transform compared to the usage of the identity transform: the special subblocks are the subblocks scanned last among the subblocks of the transform block according to the scan order and the subblock containing the predetermined non-zero coefficient residing at the position coded into the bitstream the preceding transform coefficients relative to which according to the scan order are to be inferred to be zero. For the former subblock, the significance flags of all of the at least one or more transform coefficients inside that subblock, which follow the predetermined transform coefficient in scan order, are decoded from the data stream (encoded into the data stream, respectively, at the encoder side) as long as the predetermined transform coefficient is unequal to a last transform coefficient according to the scan order, such as the DC transform coefficient (e.g., in some instances, there are not transform coefficients to decode following the predetermined transform coefficient, for example when the predetermined transform coefficient is the last transform coefficient in the subblock, in scan order). For the latter subblock, i.e. the subblock containing the predetermined non-zero coefficient, the significance flag of each transform coefficient inside that subblock which follows, along the scan order, the predetermined non-zero transform coefficient is decoded from the data stream (encoded thereinto, respectively) while it is to be inferred that the significance flag of the predetermined non-zero transform coefficient indicates significance, i.e. non-zeroness. For both subblocks, the subblock flag is inferred to assume the flag state (second flag state) other than the flag state (first flag state) indicating the complete zeroness of the corresponding subblock. The first flag state may be zero ("0") and the second flag state may be one ("1"). Only the intermediate subblocks between these subblocks according to the scan order have their corresponding subblock flag coded into the data stream (and decoded therefrom, respectively) and it is inferred that the significance flag for a lastly scanned transform coefficient inside such a subblock indicates significance if the significance flags for all transform coefficients inside that subblock, which precede the lastly scanned transform coefficient according to the scan order, indicate non-significance. Optionally, the latter procedure may also be applied for the subblocks in case of the transform being selected being the identity transform. To be more precise, in case of the transform selected for the transform block being the identity transform, the decoding of the transform coefficients from the data stream may start with the first subblock scanned within the transform block according to the scan order among all subblocks of this transform block, so that all subblocks and their corresponding transform coefficients are scanned completely, and the subblock flag for a currently decoded subblock is decoded from the data stream (encoded thereinto at the encoder side, respectively) and, if the subblock flag for the currently decoded subblock assumes the first flag state (e.g. zero), it is to be inferred that the transform coefficients inside this currently decoded subblock are zero, and if the subblock flag for the currently decoded subblock assumes the second flag state, the transform coefficients inside that subblock are decoded from (coded into) the data stream. In the latter situation, the inference of the indication of significance by the lastly scanned transform coefficient inside the corresponding subblock, in case of all preceding significance flags for preceding transform coefficients inside that subblock indicating non-significance, may be applied. According to an advantageous embodiment, if the transform selected for the transform block is the identity transform, the subblock flag for the lastly scanned subblock within the transform block is inferred to the extent that the subblock flag assumes the second flag state, in case of the subblock flags for all previously scanned subblocks inside the transform block assuming the first flag state. Altogether, this concept of using encoding the coded subblock flag in dependency of the selected transform being the identity transform or not being the identity transform, increases the efficiency and accordingly, leads to a better compression.

Advantageous embodiments of the present application are the subject of the dependent claims. Moreover, preferred embodiments of the present application are described below with respect to the figures among which:

FIG. 3 shows a relationship between a reconstructed signal and a combination of a prediction residual signal and a prediction signal.

Figure 4:
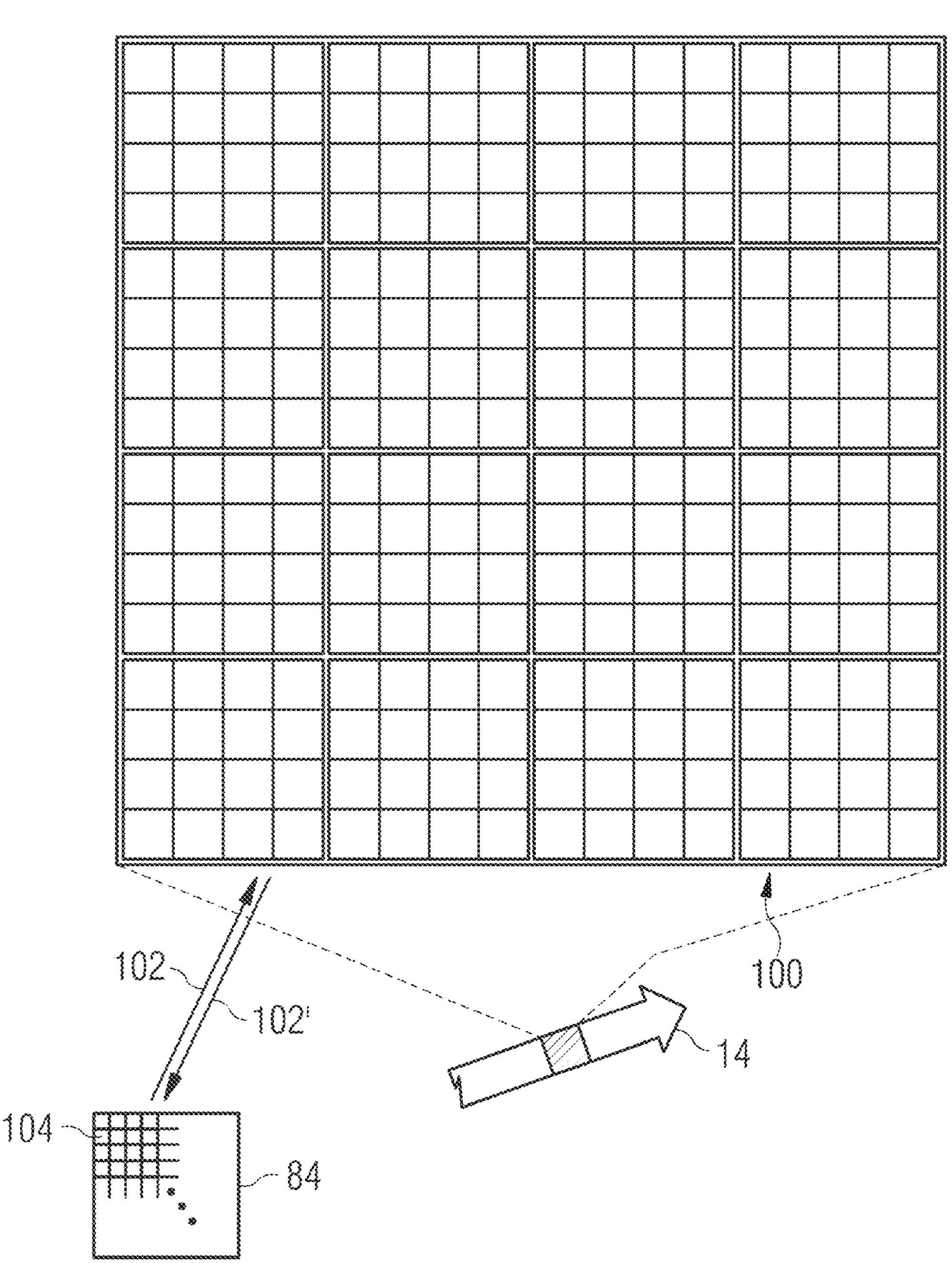
Figure 5:
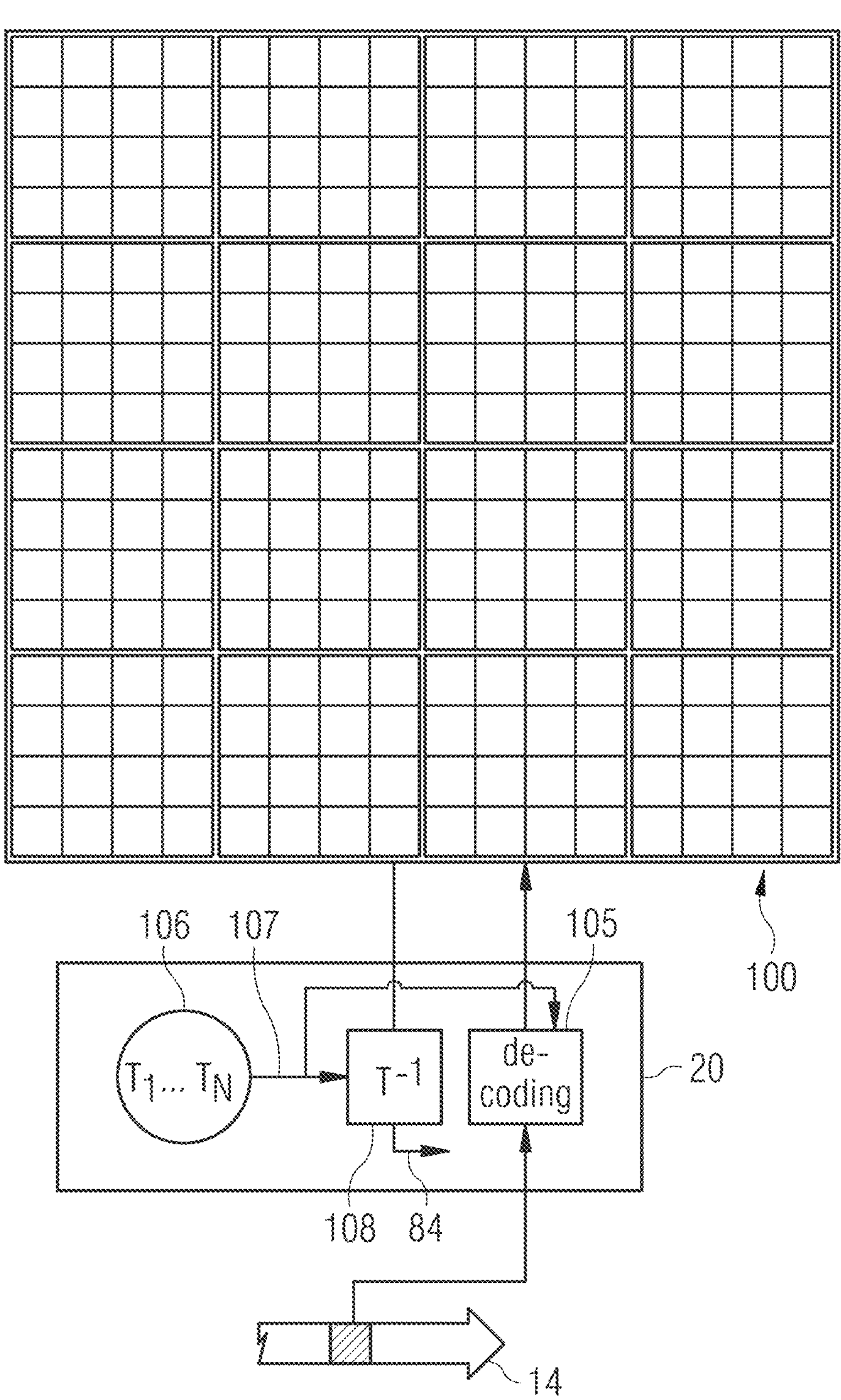
Figure 6:
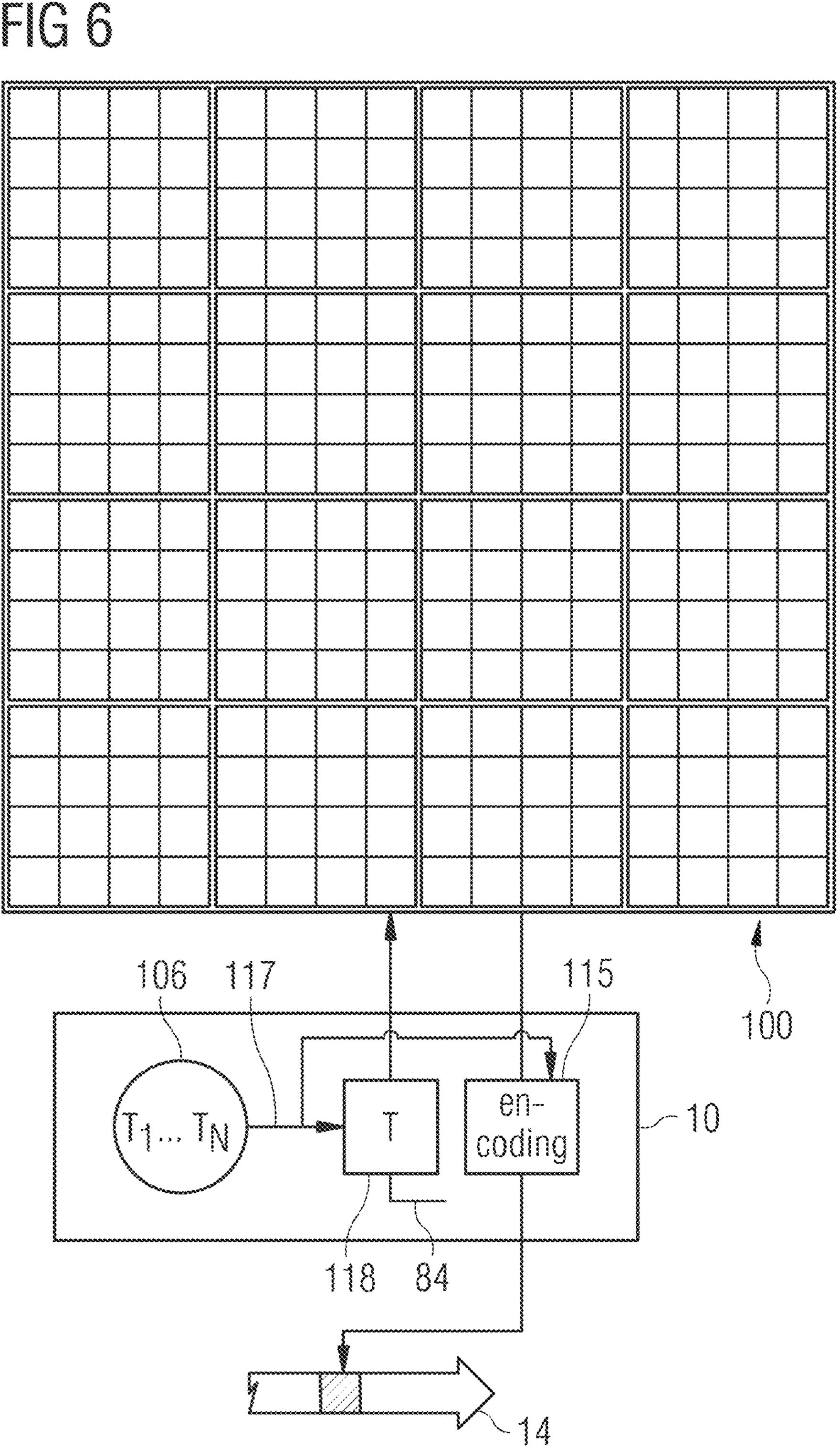
Figure 7:
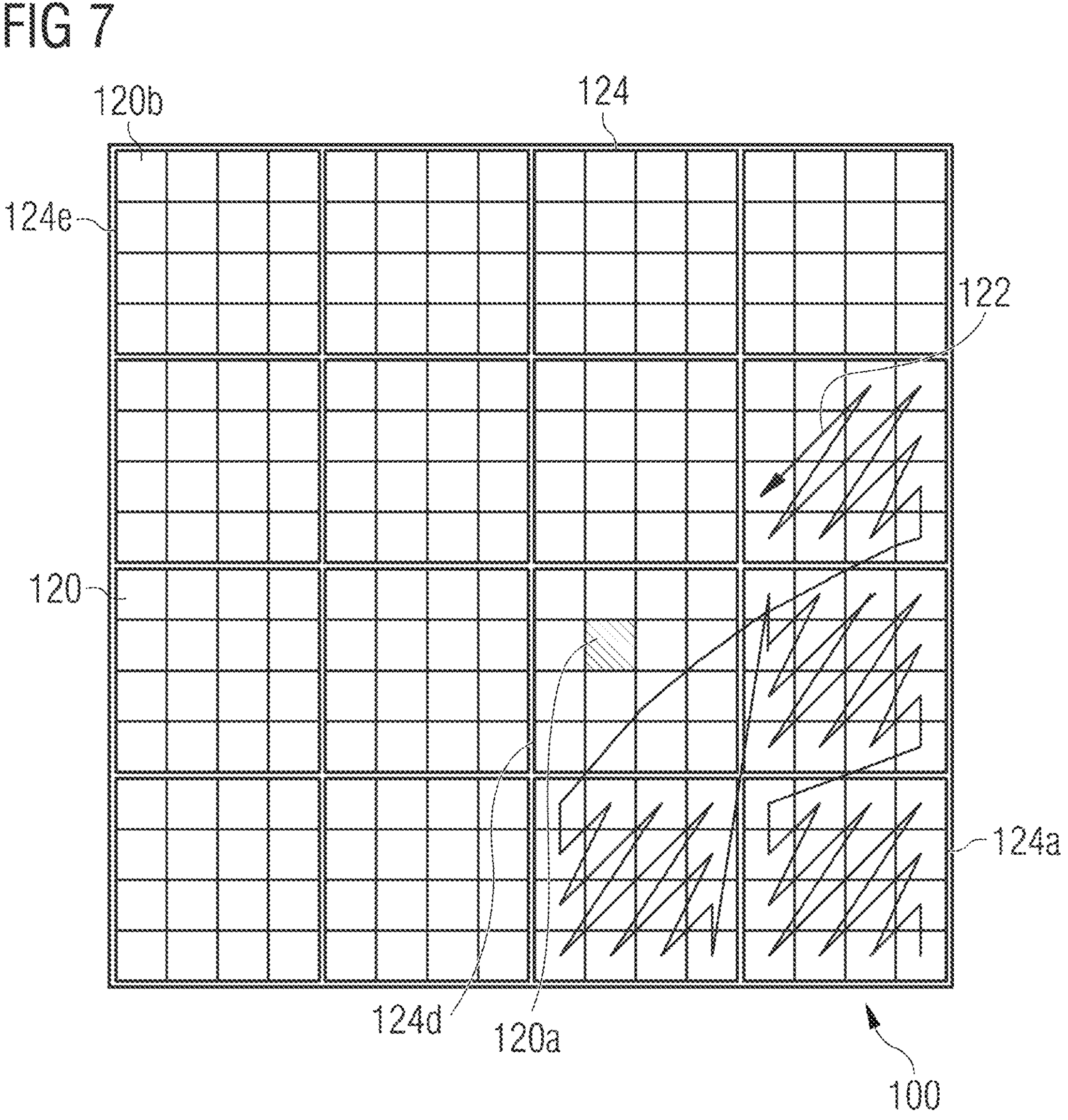
Figure 8:
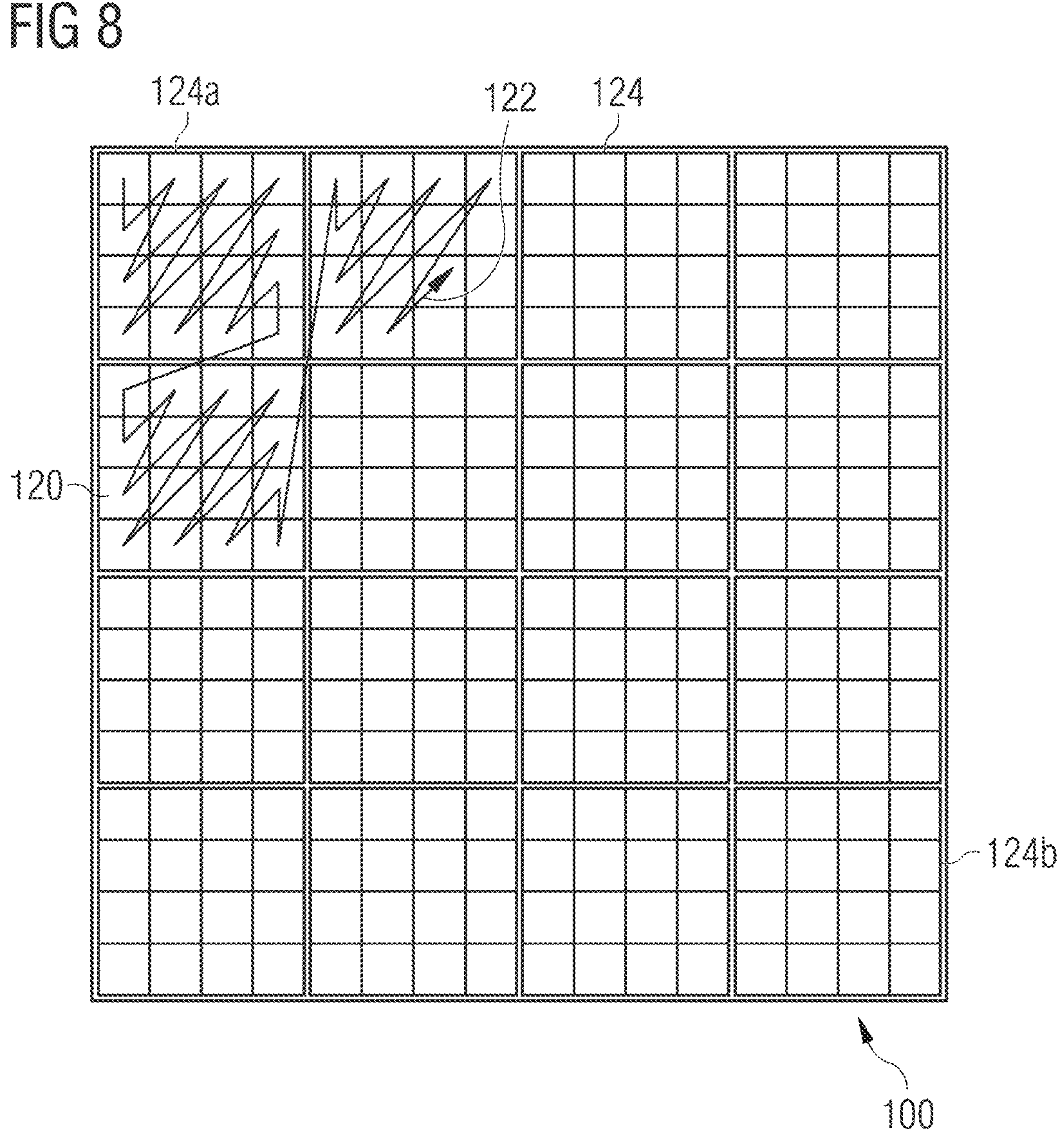

FIG. 4 schematically shows a transform block and its selected transform;

FIG. 5 schematically shows a decoder with decoding the transform block of FIG. 4 from the data stream according to an embodiment;

FIG. 6 schematically shows an encoder with encoding the transform block of FIG. 4 into the data stream according to an embodiment, the encoder fitting to the decoder of FIG. 5;

FIG. 7 schematically shows the transform block of FIG. 4 and an example for a coding/decoding same when the selected transform is a non-identity transform according to an embodiment; and FIG. 8 schematically shows the transform block of FIG. 4 and an example for a coding/decoding same when the selected transform is an identity transform according to an embodiment.

Figure 1:
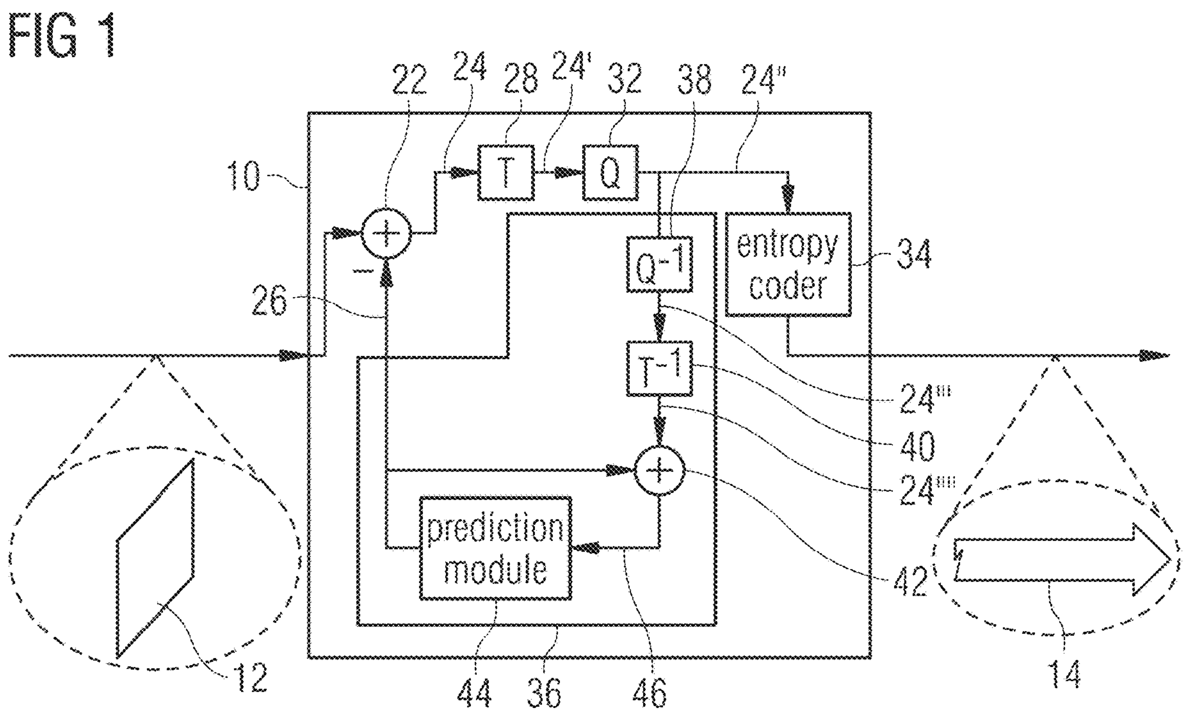
FIG. 1 shows a picture and/or video encoder.
Figure 2:
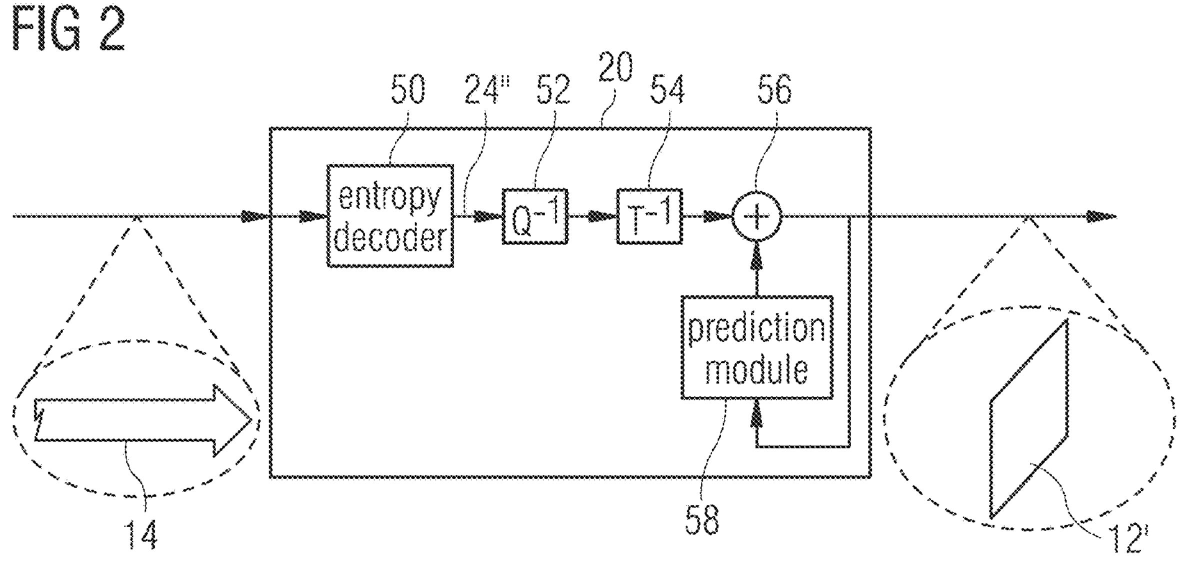
FIG. 2 shows a picture and/or video decoder.
Figure 3:
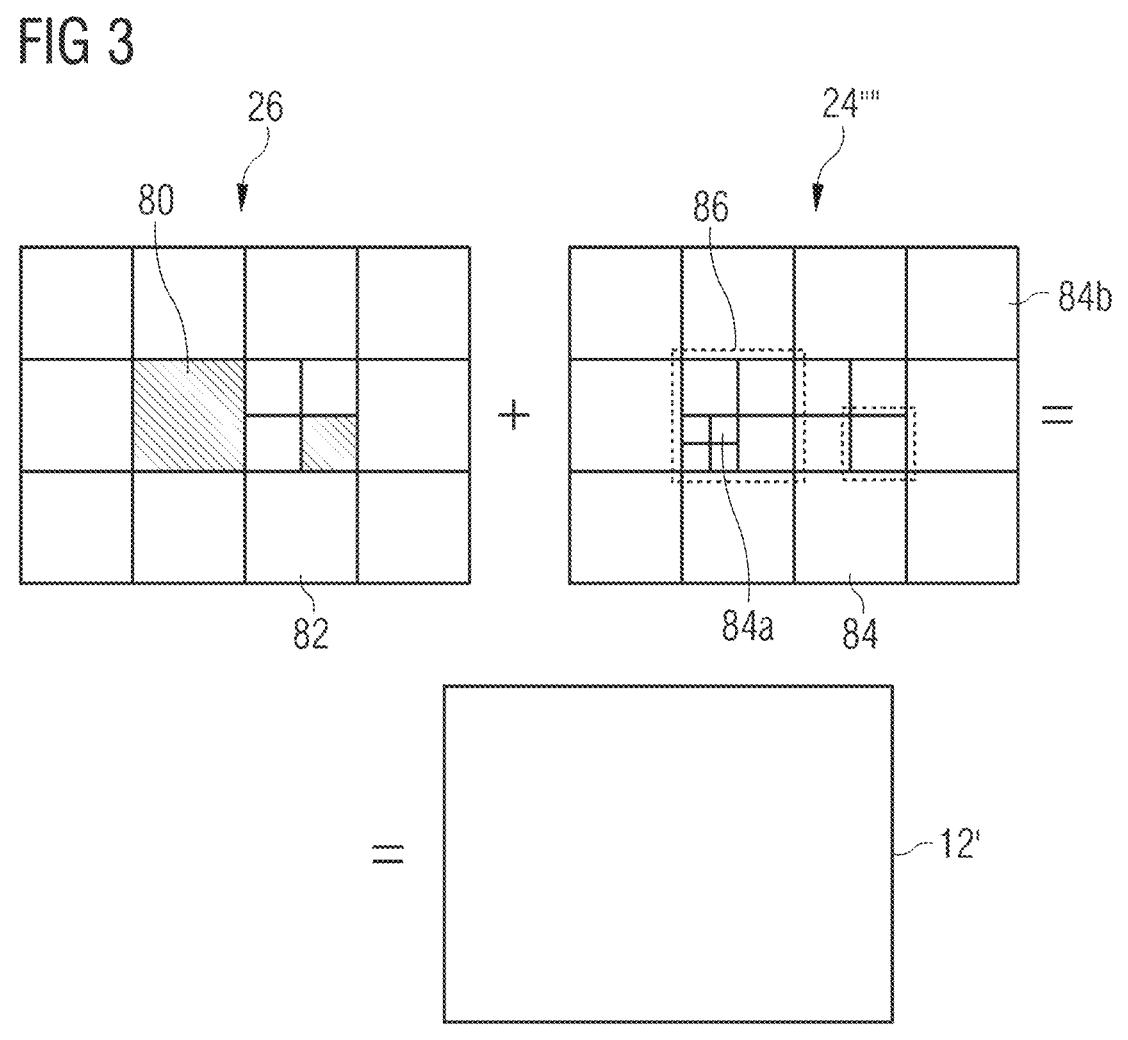

In the following, preferred embodiments of the present application are described. The description starts with a general presentation of block-based decoders/encoders into which the subsequently explained embodiments may be built into. To be more precise, FIGS. 1-3 present certain examples for decoders and encoders and the details described with respect to these figures may, individually or in combination or all, be transferred onto the subsequently explained embodiments of the present application. Differently speaking, the subsequently explained embodiments are not restricted to be implemented in the manner explained with respect to FIGS. 1-3. For instance, all details concerning the entropy coding, the prediction and the picture sub-divisioning into prediction blocks and residual blocks, which is a synonymous term to transform block, may be implemented differently.

FIG. 1 shows an apparatus for predictively coding a video 11 composed of a sequence of pictures 12 into a data stream 14. Block-wise predictive coding is used to this end. Further, transform-based residual coding is used. The apparatus, or encoder, is indicated using reference sign 10. FIG. 2 shows a corresponding decoder 20, i.e. an apparatus 20 configured to predictively decode the video 11' composed of pictures 12' in picture blocks from the data stream 14, also using transform-based residual decoding, wherein the apostrophe has been used to indicate that the pictures 12' and video 11', respectively, as reconstructed by decoder 20 might deviate from pictures 12 originally encoded by apparatus 10 in terms of coding loss introduced by a quantization of the prediction residual signal.

The encoder 10 is configured to subject the prediction residual signal to a certain transformation, namely a spatial-to-spectral transformation, and to encode the prediction residual signal, thus obtained, into the data stream 14. However, in doing so, transform switching is available, i.e. the encoder 10 supports, at least, also a transform skip mode according to which the transform is an identity transform and the prediction residual signal is coded into the data stream 14 in spatial domain directly, i.e. the relation between the coded domain and the spatial domain is the identity transform. Likewise, the decoder 20 is configured to decode the prediction residual signal from the data stream 14 and subject the prediction residual signal thus obtained to the selected spectral-to-spatial transformation unless the selected transform is the identity transform in which case the re-transformation may be skipped.

Internally, the encoder 10 may comprise a prediction residual signal former 22 which generates a prediction residual 24 so as to measure a deviation of a prediction signal 26 from the original signal, i.e. video 11 or a current picture 12. The prediction residual signal former 22 may, for instance, be a subtractor which subtracts the prediction signal from the original signal, i.e. current picture 12. The encoder 10 then further comprises a transformer 28 which subjects the prediction residual signal 24 to the mentioned spatial-to-spectral transformation, i.e. the selected transform (which transformation may be skipped in case of the identity transform), to obtain a transformed prediction residual signal 24' which is then subject to quantization by a quantizer 32, also comprised by encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction residual 26 is generated by a prediction stage 36 of encoder 10 on the basis of the prediction residual signal 24" coded into, and decodable from, data stream 14. To this end, the prediction stage 36 may internally, as is shown in FIG. 1, comprise a dequantizer 38 which dequantizes prediction residual signal 24" so as to gain transformed prediction residual signal 24''', which corresponds to signal 24' except for quantization loss, followed by an inverse transformer 40 which subjects the latter prediction residual signal 24''' to an inverse transformation, i.e. a spectral-to-spatial transformation, (if not skipped because of the selected transform being the identity transform) to obtain prediction residual signal 24"", which corresponds to the original prediction residual signal 24 except for quantization loss. A combiner 42 of the prediction stage 36 then recombines, such as by addition, the prediction signal 26 and the prediction residual signal 24"" so as to obtain a reconstructed signal 46, i.e. a reconstruction of the original signal 12. Reconstructed signal 46 may correspond to signal 12'.

A prediction module 44 of prediction stage 36 then generates the prediction signal 26 on the basis of signal 46 by using, for instance, spatial prediction, i.e. intra-prediction, and/or temporal prediction, i.e. inter-prediction. Details in this regard are described in the following.

Likewise, decoder 20 may be internally composed of components corresponding to, and interconnected in a manner corresponding to, prediction stage 36. In particular, entropy decoder 50 of decoder 20 may entropy decode the quantized transformed prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 2, the output of combiner 56 results in the reconstructed signal, namely the video 11' or a current picture 12' thereof.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost, and/or using some rate control. As described in more details below, encoder 10 and decoder 20 and the corresponding modules 44, 58, respectively, support different prediction modes such as intra-coding modes and inter-coding modes which form a kind of set or pool of primitive prediction modes based on which the predictions of picture blocks are composed in a manner described in more detail below. The granularity at which encoder and decoder switch between these prediction compositions may correspond to a subdivision of the pictures 12 and 12', respectively, into blocks. Note that some of these blocks may be blocks being solely intra-coded and some blocks may be blocks solely being inter-coded and, optionally, even further blocks may be blocks obtained using both intra-coding and inter-coding. According to intra-coding mode, a prediction signal for a block is obtained on the basis of a spatial, already coded/decoded neighborhood of the respective block. Several intra-coding modes may exist the selection among which, quasi, represents a kind of intra-prediction parameter. There may be directional or angular intra-coding modes according to which the prediction signal for the respective block is filled by extrapolating the sample values of the neighborhood along a certain direction which is specific for the respective directional intra-coding mode, into the respective block. The intra-coding modes may, for instance, also comprise one or more further modes such as a DC coding mode, according to which the prediction signal for the respective block assigns a DC value to all samples within the respective block, and/or a planar intra-coding mode according to which the prediction signal of the respective block is approximated or determined to be a spatial distribution of sample values described by a two-dimensional linear function over the sample positions of the respective block with deriving tilt and offset of the plane defined by the two-dimensional linear function on the basis of the neighboring samples. Compared thereto, according to inter-prediction mode, a prediction signal for a block may be obtained, for instance, by temporally predicting the block inner. For parametrization of an inter-prediction mode, motion vectors may be signaled within the data stream, the motion vectors indicating the spatial displacement of the portion of a previously coded picture of the video 11 at which the previously coded/decoded picture is sampled in order to obtain the prediction signal for the respective block. This means, in addition to the residual signal coding comprised by data stream 14, such as the entropy-coded transform coefficient levels representing the quantized transformed prediction residual signal 24", data stream 14 may have encoded thereinto prediction related parameters for assigning to the blocks prediction modes, prediction parameters for the assigned prediction modes, such as motion parameters for inter-prediction modes, and, optionally, further parameters which control a composition of the final prediction signal for the blocks using the assigned prediction modes and prediction parameters as will be outlined in more detail below. Additionally, the data stream may comprise parameters controlling and signaling the subdivision of picture 12 and 12', respectively, into the blocks. The decoder 20 uses these parameters to subdivide the picture in the same manner as the encoder did, to assign the same prediction modes and parameters to the blocks, and to perform the same prediction to result in the same prediction signal.

Note that intra- and inter-prediction as described relate to sample prediction as the predictor resulting therefrom predicts the samples of a block (prediction block). Each parameter described, however, may possibly also subject to prediction, then called parameter prediction. For instance, spatial prediction may be used to predict the intra-coding mode for an intra-coded block and is, optionally, only coed whether any of these predictors is used for the intra-coded block or not, or the motion vector for an inter-coded block and it is, optionally, the difference or deviation which is coded for the inter-predicted block.

FIG. 3 illustrates the relationship between the reconstructed signal, i.e. the reconstructed picture 12', on the one hand, and the combination of the prediction residual signal 24"" as signaled in the data stream, and the prediction signal 26, on the other hand. As already denoted above, the combination may be an addition. The prediction signal 26 is illustrated in FIG. 3 as a subdivision of the picture area into blocks 80 of varying size, although this is merely an example. The subdivision may be any subdivision, such as a regular subdivision of the picture area into rows and columns of blocks, or a multi-tree subdivision of picture 12 into leaf blocks of varying size, such as a quadtree subdivision or any other recursive multi-tree subdivision or the like, wherein a mixture thereof is illustrated in FIG. 3 where the picture area is firstly subdivided into rows and columns of tree-root blocks which are then further subdivided in accordance with a recursive multi-tree subdivisioning to result into blocks 80.

The prediction residual signal 24"" in FIG. 3 is also illustrated as a subdivision of the picture area into blocks 84. These blocks might be called transform blocks in order to distinguish same from the coding blocks 80. In effect, FIG. 3 illustrates that encoder 10 and decoder 20 may use two different subdivisions of picture 12 and picture 12', respectively, into blocks, namely one subdivisioning into coding blocks 80 and another subdivision into transform (or residual) blocks 84. Both subdivisions might be the same, i.e. each block 80, may concurrently form a transform block 84 and vice versa, but FIG. 3 illustrates the case where, for instance, a subdivision into transform blocks 84 forms an extension of the subdivision into blocks 80 so that any border between two blocks 80 overlays a border between two blocks 84, or alternatively speaking each block 80 either coincides with one of the transform blocks 84 or coincides with a cluster of transform blocks 84. However, the subdivisions may also be determined or selected independent from each other so that transform blocks 84 could alternatively cross block borders between blocks 80. As far as the subdivision into transform blocks 84 is concerned, similar statements are thus true as those brought forward with respect to the subdivision into blocks 80, i.e. the blocks 84 may be the result of a regular subdivision of picture area into blocks, arranged in rows and columns, the result of a recursive multi-tree subdivisioning of the picture area, or a combination thereof or any other sort of segmentation. Just as an aside, it is noted that blocks 80 and 84 are not restricted to being quadratic, rectangular or any other shape. Further, the subdivision of a current picture 12 into blocks 80 at which the prediction signal is formed, and the subdivision of a current picture 12 into blocks 84 at which the prediction residual is coded, may not the only subdivision used for coding/decoding. These subdivisions form a granularity at which prediction signal determination and residual coding is performed, but firstly, the residual coding may alternatively be done without subdivisioning, and secondly, at other granularities than these subdivisions, encoder and decoder may set certain coding parameters which might include some of the aforementioned parameters such as prediction parameters, prediction signal composition control signals and the like.

FIG. 3 illustrates that the combination of the prediction signal 26 and the prediction residual signal 24"" directly results in the reconstructed signal 12'. However, it should be noted that more than one prediction signal 26 may be combined with the prediction residual signal 24"" to result into picture 12' in accordance with alternative embodiments such as prediction signals obtained from other views or from other coding layers which are coded/decoded in a separate prediction loop with separate DPB, for instance.

In FIG. 3, the transform blocks 84 shall have the following significance. Transformer 28 and inverse transformer 54 perform their transformations in units of these transform blocks 84. For instance, many codecs use some sort of DST or DCT for all transform blocks 84. According to at least one transform option, the transformation is skipped so that, for some of the transform blocks 84, the prediction residual signal is coded in in the spatial domain directly. The transforms supported may, besides the identity transform, comprise one or more of:

- DCT-II (or DCT-III), where DCT stands for Discrete Cosine Transform
- DST-IV, where DST stands for Discrete Sine Transform
- DCT-IV
- DST-VII The one or more non-identity transforms may be separable transforms. Secondary transforms which may be non-separable transforms, might be applicable to a low frequency portion such as a sub-array extending from the DC component to some intermediate component other than the DC and highest frequency components. The encoder may decide on the usage of such secondary transform and select one for certain blocks and signal the decision to the decoder.

In the following, embodiments for coding/decoding a picture from a data stream are presented, which, as already announced above, might be combined with the examples for decoders and encoders of FIGS. 1-3. The coding concept underlying these embodiments relate to the coding of the transform blocks, i.e. the representation of residual blocks in transform domain. FIG. 4 shows such a transform block 100 which is, as outlined with respect to FIGS. 1-3, coded into the data stream 14 in transform domain so that the transform block 100 is related to the prediction residual of a corresponding residual block 84 via a corresponding transform 102 (and its re-transform 102', respectively). That is, the residual block's 84 spatial domain representation, consisting of an array of (residual) samples 104 results into transform block 100 via transform 102, while the re-transform 102', when applied to transform block 100, results into residual block 84 and its samples 104.

As shown in FIG. 5, the decoder 20 of the present embodiment decodes 105 from block 100 from the data stream and, additionally, supports a pool or plurality 106 of transforms $T_1 \ldots T_N$ out of which decoder 20 selects 107 the correct transform 102 in a predetermined manner with, in case of the selected transform 102 not being the identity transform, subjecting the obtained transform block 100 to the corresponding re-transform 102' of the selected transform 102 so as to yield the transform block in spatial domain, i.e. the residual block 84 in spatial domain which may then serve as a prediction residual for the block-based prediction of the picture which decoder 20 decodes from the data stream 14. To be more precise, at least one of the N with N being any integer greater than 1, transforms $T_1 \ldots T_N$ is an identity transform such as $T_1$, and if same is selected for transform block 100, the re-transformation 108 might be skipped.

Different embodiments exist with respect to the selection 107 of the selected transform: the encoder may select the transform on a large scale such as for a whole picture, a sequence of pictures or a slice of a picture including many transform blocks and select the selected transform out of pool 106 to decoder 20 via bitstream 14. However, it would also be possible that the encoder performs the selection of transform 102 on a finer scale such as per transform block 100, such as for optimization in rate/distortion sense, with signaling the selected transform for transform block 100 within data stream 14. Naturally, intermediate embodiments are also feasible according to which the encoder selects the transform for a set of transform blocks such as per tree root block or the like. In the latter case, where the encoder signals the selected transform for transform block 100 within bitstream 14, it might be that the data stream 14 indicates the transform selection signaling within bitstream 14 by way of a higher level syntax element such as by a syntax element sent in the bitstream 14 per slice or per picture or per picture sequence. An example for such high level syntax element is mentioned below by way of sh_ts_residual_coding_disabled_flag. That is, it might be that the encoder is allowed to allow for a switching between an identity transform $T_1$ and one or more non-identity transforms $T_{>1}$ only in case of such a corresponding high level syntax element being enabled.

For sake for completeness, FIG. 6 shows an encoder fitting to the decoder of FIG. 5. It performs the transform 118, if not skipped, as selected by selection 117, to yield the transform block 100, which is then encoded 115 by the encoder 10 into the bitstream 14.

In order to decode from, and encode into, bitstream 14 the coefficients 120 of transform block 100 decoder 20 and encoder 10 use a scan order 122. Further, the decoding/encoding is done using a subblock sub-division of transform block 100 into subblocks 124. FIGS. 4 to 7 illustrate a sub-division into subblocks, each comprising 4×4 transform coefficients 120, but this should be understood as an example only and the transform block 100 could be subdivided into an array of such subblocks 124 in a different manner. In any case, the scan order 122 traverses the transform coefficients 120 or their positions within transform block 100 subblock by subblock meaning that the scan order 122 traverses all transform coefficients of a certain subblock 124 before preceding with transform coefficients of a subsequent subblock so that between two transform coefficients of a predetermined subblock no transform coefficient of a different subblock is traversed. That is, scan order 122 defines, not only, an order among transform coefficients 120, but also a decoding/coding order among subblocks 124. In the example of FIG. 7, both, the subblocks 124 and the transform coefficients 120 within each subblock 124, are scanned diagonally from one corner of transform block 100 towards the diagonally opposite corner of transform block 100, and the diagonal subpathes leading perpendicular thereto, but this should not be understood as limiting the embodiments of the present application which may be varied with regard to the selection of the scan path of scan order 122. For instance, a zigzag or raster scan may be used for the traversal of the transform coefficients 120 for all or individual subblocks 124 instead of the diagonal scan order, and similarly, a different scan order such as a zigzag scan order or raster scan order may be used for the subblock scan.

In addition to scanning the transform coefficients 120 in units of subblocks, the decoding/encoding also uses subblock flags in order to signal for the subblocks 124 within bitstream 14 whether all transform coefficients 124 within the subblocks are zero or not. To be more precise, subblock flags are decoded from, and encoded into, bitstream 14 with each subblock flag being associated with a corresponding subblock 124 and indicating, when using a certain first flag state, such as zero ("0"), that all transform coefficients within the corresponding subblock are inferred to be zero.

Later on, such a syntax element is presented as sb_coded_flag. Advantageously, decoder and encoder may skip the decoding/encoding of the transform coefficients 120 for any subblock 124 for which the corresponding subblock flag indicates the zeroness of its transform coefficients.

As indicated in FIGS. 5 and 6, however, the decoding 105 and encoding 115 of the transform block 100 is done in a manner depending on the transform selection 107/117. This is explained in more detail below.

The embodiment outlined now varies the decoding/encoding of the transform coefficients 120, inter alias, in terms of the scan order 122, namely in that the scan order 122 used in case of the identity transform being selected being different relative to the case where a non-identity transform is selected for transform block 100, but it should be understood that this variation of the scan order 122 depending on the selected transform or the transform selection, respectively, is optional and may be left off. Nevertheless, due to the variation, the decoding/encoding of the transform coefficients in case of the transform selected for the transform block 100 being the identity transform, is explained with respect to FIG. 8, while FIG. 7 will be used in order to explain the decoding/encoding of the transform coefficients in case of the selected transform being a non-identity transform. According to the example of FIGS. 7 and 8, the scan order 120 traverses subblocks 124 and transform coefficients 120 within each subblock 124 diagonally both in case of the transform selected being the non-identity transform and the identity transform, respectively, but the scan order 120 traverses the transform coefficients 120 in opposite directions. That is, in case of the identity transform, as shown in FIG. 8, the transform coefficients 120 and subblocks 124 are traversed from the upper left corner towards the bottom right-hand corner, while the transform coefficients 120 are traversed from the bottom right-hand corner towards the upper left corner in case of the transform selected being a non-identity transform as shown in FIG. 7.

In any case, in case of the transform selected being the identity transform, the transform coefficients 120 and subblocks 124, respectively, are encoded/decoded completely. That is, the decoding/encoding of the transform coefficients takes place starting with transform coefficients 120 inside the upper left subblock 124*a*, i.e. the one traversed firstly among all subblocks 124 of transform block 100 according to scan order 120 whereupon scan order 122 traverses all other subblocks. In the embodiment of FIG. 8, a subblock flag may, thus, be encoded/decoded for every subblock 124 except, as will be outlined in more detail next, the subblock flag for the last subblock 124*b* in scan order 120 which might be inferred on the basis of the settings of the subblock flags of all other (previously traversed) subblocks 124. In particular, in decoding/encoding the transform coefficients 120, a first subblock-related check is performed each time the scan order 120 firstly traverses a certain subblock or visits a first transform coefficient of a certain subblock. This subblock-related check involves checking whether all transform coefficients within the corresponding subblock are zero, as far as the encoder side is concerned, in which case a subblock flag for this subblock is encoded into the data stream as having a first flag state, which indicates zeroness of all transform coefficients, and at the decoder side, the subblock-related check involves decoding the corresponding subblock flag to see whether same assumes the first flag state in which case the decoder infers that all transform coefficients within the corresponding subblock flag are zero. If zeroness does not apply, i.e. the subblock flag is not in the first flag state, then the transform coefficients 120 within the corresponding subblock 124 are encoded into, and decoded from, the bitstream 14 which decoding/encoding may involve the coding of significance flags for transform coefficients, the significance flags indicating whether a corresponding transform coefficient is zero or not. For significant transform coefficients, which are non-zero, further syntax elements are coded/decoded which then indicate the magnitude and sign of the corresponding transform coefficient. The transform coefficients within such subblock are coded/decoded according to the scan order 120. As for such subblocks 124, where the subblock flag indicates the second flag state, i.e. non-zeroness, at least one transform coefficient must be non-zero, the subblock flag is exploited in that the significance flag for the lastly scanned transform coefficient inside such subblock is inferred to indicate significance if the significance flags for all transform coefficients inside that subblock which precede the lastly scanned transform coefficient indicate non-significance. In the example of FIG. 8, the lastly scanned transform coefficients inside each subblock are the ones at the bottom right corner of each subblock, while all other transform coefficients within the subblocks form the basis for the influence decision: if, within a certain subblock 124, the significance flags for all 15 transform coefficients other than the one at the bottom right hand corner, indicate non-significance, the significance flag for the transform coefficient at the bottom right hand corner is inferred to indicate significance and is not coded/decoded. Similarly, the decoding of the subblock flag for the last subblock 124*b* is done: if the subblock flags for all previously traversed subblocks are in the first flag state, thereby indicating subblock-global zeroness, the subblock flag for the last subblock 124*b* is not coded/decoded, but inferred to be in the second flag state, instead, and even in this situation where the subblock flag of subblock 124*b* has been inferred, the significance flag of the lastly scanned transform coefficient within the subblock 124*b* may be inferred to indicate significance if all preceding significance flags of all preceding transform coefficients within that subblock 124*b* indicate non-significance, i.e. in both cases, the case where the subblock flag for subblock 124*b* has been explicitly coded/decoded and in case where the subblock flag for subblock 124*b* has been inferred.

A different way of decoding/encoding is used in case of the selected transform being a non-identity transform. FIG. 7 is used to describe the decoding/encoding of the transform coefficients 120 in this case. Due to the transform being a non-identity transform, non-zero transform coefficients tend to be clustered towards the upper left corner of transform block 100, i.e. towards the transform coefficient scanned last by scan order 122. In order to save coding costs, a position of a predetermined non-zero transform coefficient 120*a* is encoded into, and decoded from, the bitstream, with this predetermined transform coefficient 120*a* being highlighted by hatching in FIG. 7. The decoding of the transform coefficients 120 is started with this predetermined non-zero transform coefficient while it is inferred that all transform coefficients preceding this predetermined non-zero transform coefficient 120*a* in scan order are zero. In line with the coding/decoding of FIG. 8, i.e. the identity transform case, subblock flags are used in order to indicate subblocks 124 whose transform coefficients are all zero, but other than the identity transform case of FIG. 8, the subblock flags of certain subblocks are inevitably not coded/decoded but inferred. In particular, these specific subblocks are the subblock 124*d* containing the predetermined the transform coefficient 120*a,* and the subblock 124*e* located at the top left corner of transform block 100, i.e. the one lastly scanned by scan order 122. For these two subblocks, it is inferred that the subblock flag assumes the second flag state, i.e. indicating no (complete) zeroness. For subblock 124*d*, the inference is a result of the fact that the subblock 124*d* is known to encompass the predetermined non-zero transform coefficient 120*a*. In case of subblock 124*e,* the inference is a result of the fact that spending the subblock flag for this "DC subblock" 124*e* may very likely be inefficient due to the fact that it is unlikely that its lastly scanned transform coefficient, which, in the present case of FIG. 7 lies at the top left corner of subblock 124*e,* and which is the DC transform coefficient 120*b* of transform block 100 in case of the selected transform being a spectral transform, is unlikely to be inferable as indicating significance due to the fact that it is unlikely that all other transform coefficients within that DC subblock 124*e* are really zero (this case also applies whenever the predetermined non-zero transform coefficient 120*a* is the last scanned position in any current subblock-not just the last subblock in the transform block, since the scan is on a block by block basis.). That is, for all subblocks 124 following, in scan order 122, subblock 124*d* and preceding, in scan order 122, subblock 124*e,* a subblock flag is decoded/encoded and depending thereon, namely when it assumes the first flag state, it is to be inferred that all transform coefficients within the corresponding subblock are zero. If, for such a subblock, however, the signaled subblock flag is in the second flag state, the significance flags for the transform coefficients within the corresponding subblock are coded usually except for the significance flag of the lastly scanned transform coefficient inside the corresponding subblock, namely the one at the top left corner, which may be inferred to indicate significance in case of the significance flags for all other transform coefficients within that subblock indicating non-significance. For subblock 124*d,* whose subblock flag is inferred to be in the second flag state, the significance flags of all transform coefficients inside that subblock, which follow, along the scan order 122, the predetermined non-zero transform coefficient 120*a,* are encoded/decoded while the significance flag of the predetermined non-zero transform coefficient 120*a* is to be inferred as indicating significance. For subblock 124*e,* whose subblock flag is also inferred to assume the second flag state, the decoding/encoding of the significance flag is performed for all of the at least one or more transform coefficients inside that subblock which follow the predetermined non-zero transform coefficient 120*a* in scan order 122, if the predetermined non-zero transform coefficient 120*a* is unequal to a last transform coefficient, i.e. the DC coefficient 120*b,* of the subblock 124*e*. To be more precise, if the predetermined non-zero transform coefficient 120*a* was the DC coefficient, no significance flag would have to be coded for subblock 124*e* at all, as there is no transform coefficient inside that subblock 124*e* which follows the predetermined non-zero transform coefficient 120*a* in scan order 122, and likewise, the subblock flag for subblock 124*e* is also inferred as described above. If, however, the predetermined non-zero transform coefficient 120*a* is not the DC coefficient, at least one significance flag would have to be coded for subblock 124*e,* as there is at least one transform coefficient inside that subblock 124*e* which follows the predetermined non-zero transform coefficient 120*a* in scan order 122.

Although not explicitly mentioned with respect to FIG. 7, it is clear that the decoding/encoding of the transform coefficients also involves the coding/decoding of further syntax elements for transform coefficients which are significant.

In accordance with an embodiment, the position of the predetermined non-zero transform coefficient 120*a* is signaled in the data stream in form of two coordinates indicative of column and row of the transform block 100 within which the position lies.

Thus, in other words, above description revealed a determination of sub-shape size and significance in flexible block-based hybrid video coding. The embodiments described with respect to FIGS. 4 to 8 could be applied to VVC's sb_coded_flag syntax element.

As has become apparent from the above description, the application of coded subblock flags may be performed differently between the case of applying an identity transform to a currently coded transform block on the one hand and applying a non-identity transform to the currently coded transform block on the other hand, in a manner yielding improved coding efficiency.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded image signal can be stored on a digital storage medium or can be transmitted on a transmission medium such as a wireless transmission medium or a wired transmission medium such as the Internet.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

The above described embodiments are merely illustrative for the principles of the present disclosure. It is understood that modifications and variations of the arrangements and the details described herein will be apparent to others skilled in the art. It is the intent, therefore, to be limited only by the scope of the pending patent claims and not by the specific details presented by way of description and explanation of the embodiments herein.

The following clauses are also encompassed by the present disclosure, wherein the reference numerals are added for clarification, not limitation.

1. Decoder for decoding a picture (12) from a data stream (14) in a block-based manner using prediction and using transform-based residual decoding with transform selection (107) among a set (106) of transforms including an identity transform and at least one non-identity transform, configured to, for a transform block (100),
   decode (105), from the data stream (14),
      transform coefficients (120) of the transform block (100) using a scan order (122); and
      subblock flags, each subblock flag
         being associated with a corresponding subblock of an array of subblocks (124), into which the transform block (100) is subdivded, and which are traversed by the scan order (122) subblock by subblock, and
         indicating, when assuming a first flag state, that all transform coeffidients (120) within the corresponding subblock are inferred to be zero,
   wherein the decoder is configured to
      if a transform (102) selected for the transform block (100) is the identity transform,
      decode the transform coefficients (120) from the data stream (14) by
         starting with transform coefficients (120) inside a predetermined subblock (124*a*), which, according to the scan order (122), is traversed firstly among the subblocks (124), and after which, according to the scan order (122), the subblocks (124) of the array of sublocks (124), except the predetermined subblock (124*a*), are scanned completely, and decoding the subblock flag for a currently decoded subblock, and, if the subblock flag for the currently decoded subblock assumes the first flag state, inferring that the transform coefficients (120) inside the currently decoded subblock are zero, and if the subblock flag for the currently decoded subblock assumes a second flag state, decoding the transform coefficients (120) inside the currently decoded subblock from the data stream (14), and if the transform (102) selected for the transform block (100) is not the identity transform, decode the transform coefficients (120) from the data stream (14) by decoding a position of a perdetermined non-zero transform coefficient (120*a*) inside the transform block (100) from the data stream (14), starting with the perdetermined non-zero transform coefficient (120*a*) with inferring that all transform coefficients preceeding the perdetermined non-zero transform coefficient (120*a*) in scan order (122) are zero, and deriving the subblock flag for a currently decoded subblock, and, if the subblock flag for the currently decoded subblock assumes the first flag state, inferring that the transform coefficients (120) inside the currently decoded subblock are zero, and if the subblock flag for the currently decoded subblock assumes a second flag state, decoding the transform coefficients (120) inside the currently decoded subblock from the data stream (14) with if the currently decoded subblock is scanned last among the subblcks (124) of the transform block (100) according to the scan order (122), inferring that the subblock flag for the the currently decoded subblock assumes the the second flag state, and decoding the signifance flag of all of the at least one or more transform coefficients (120) inside the currently decoded subblock from the data stream which follow the predetermined non-zero transform coefficient (120*a*) in scan order, if the predetermined non-zero transform coefficient (120*a*) is unequal to a last transform coefficient (120*b*) according to the scan order (122), and if the currently decoded subblock contains the predetermined non-zero coeffiicent (120*a*), inferring that the subblock flag for the the currently decoded subblock assumes the the second flag state, and decoding the signifcance flag of each transform coefficient inside the currently decoded subblock whhich follows, along the scan order (122), the predetermined non-zero transform coefficient (120*a*) and inferring that the signifacne flag of the predetermined non-zero transform coefficient (120*a*) indicates significace, and if the currently decoded subblock's transofrm coefficients are not scanned last among the transform coefficients of the transform block according to the scan order, and the currently decoded subblock does not contain the predetermined non-zero coeffiicent (120*a*), decoding the suublock flag of the currently decoded subblock from the data stream and inferring that a signifcance flag for a lastly scanned transform coefficient inside the currently decoded subblock indicates significance, if the significane flags for all transform coefficients inside the currently decoded subblock, which preceed the lastly scanned transform coefficient according to the scan order (122), indicate non-significance.

2. Decoder of clause 1, wherein the scan order traverses the subblocks (124) and the transform coefficients (120) within each subblock (124)

in case of the transform (102) selected for the transform block (100) being the identity transform oppositely compared to the case of the transform (102) selected for the transform block (100) not being the identity transform.

3. Decoder of clause 1 or 2, wherein the scan order traverses the subblocks (124) and the transform coefficients (122) within each subblock diagonally.

4. Decoder of any of clauses 1 to 3, configured to if the transform (102) selected for the transform block (100) is the identity transform, if the currently decoded subblock's transform coefficients are scanned last among the transform coefficients of the transform block (100) according to the scan order (122), inferring that the subblock flag for the currently decoded subblock assumes the second flag state, if the subblock flags for all subblocks (124) inside the transform block (100), which preceed the currently decoded subblock according to the scan order, assume the first flag state, and if the currently decoded subblock's transform coefficients are not scanned last among the transform coefficients of the transform block (100) according to the scan order (122), decoding the subblock flag for the currently decoded subblock from the data stream.

5. Decoder of any of clauses 1 to 4, configured to if the transform selected for the transform block is the identity transform, inferring that a signifcance flag for a lastly scanned transform coefficient inside the currently decoded subblock indicates significance, if the significane flags for all transform coefficients inside the currently decoded subblock, which preceed the lastly scanned transform coefficient according to the scan order, indicate non-significance.

6. Decoder of any of clauses 1 to 5, configured to if the transform selected for the transform block is not the identity transform, decoding the position of a perdetermined non-zero transform coefficient inside the transform block from the data stream in form of two coordinates indicative of a column and a row of the transform block, which contains the position.

7. Encoder for encoding a picture (12) into a data stream (14) in a block-based manner using prediction and using transform-based residual coding with transform selection (117) among a set (106) of transforms including an identity transform and at least one non-identity transform, configured to, for a transform block (100), encode (115), into the data stream (14), transform coefficients (120) of the transform block (100) using a scan order (122); and subblock flags, each subblock flag being associated with a corresponding subblock of an array of subblocks (124), into which the transform block (100) is subdivded, and which are traversed by the scan order (122) subblock by subblock, and indicating, when assuming a first flag state, that all transform coeffidients (120) within the corresponding subblock are inferred to be zero, wherein the encoder is configured to if a transform (102) selected for the transform block (100) is the identity transform, encode the transform coefficients (120) into the data stream (14) by starting with transform coefficients (120) inside a predetermined subblock (124*a*), which, according to the scan order (122), is traversed firstly among the subblocks (124), and after which, according to the scan order (122), the subblocks (124) of the array of sublocks (124), except the predetermined subblock (124*a*), are scanned completely, and encoding the subblock flag for a currently encoded subblock, wherein, if the subblock flag for the currently encoded subblock assumes the first flag state, the transform coefficients (120) inside the currently encoded subblock are inferred to be zero, and if the subblock flag for the currently encoded subblock assumes a second flag state, the encoder is configured to encode the transform coefficients (120) inside the currently encoded subblock into the data stream (14), and if the transform (102) selected for the transform block (100) is not the identity transform, encode the transform coefficients (120) into the data stream (14) by encoding a position of a perdetermined non-zero transform coefficient (120*a*) inside the transform block (100) into the data stream (14), starting with the perdetermined non-zero transform coefficient (120*a*) wherein all transform coefficients preceeding the perdetermined non-zero transform coefficient (120*a*) in scan order (122) are to be inferred to be zero, and deriving the subblock flag for a currently encoded subblock, wherein, if the subblock flag for the currently encoded subblock assumes the first flag state, the transform coefficients (120) inside the currently encoded subblock are to be inferred to be zero, and if the subblock flag for the currently encoded subblock assumes a second flag state, the encoder is configured to encode the transform coefficients (120) inside the currently encoded subblock into the data stream (14) with if the currently encoded subblock is scanned last among the subblcks (124) of the transform block (100) according to the scan order (122) (i.e. the currently encoded subblock's transform coefficients are scanned last among the transform coefficients of the transform block according to the scan order), the subblock flag for the the currently encoded subblock being to be inferred as assuming the the second flag state, and encoding the signifance flag of all of the at least one or more transform coefficients (120) inside the currently encoded subblock into the data stream which follow the predetermined non-zero transform coefficient (120*a*) in scan order, if the predetermined non-zero transform coefficient (120*a*) is unequal to a last transform coefficient (120*b*) according to the scan order (122), and if the currently encoded subblock contains the predetermined non-zero coeffiicent (120*a*) (i.e. the position), the subblock flag for the the currently encoded subblock being to be inferred as assuming the the second flag state, and encoding the signifcance flag of each transform coefficient inside the currently encoded subblock whhich follows, along the scan order (122), the predetermined non-zero transform coefficient (120*a*) wherein the signifacne flag of the predetermined non-zero transform coefficient (120*a*) is to be inferred as indicating significace, and if the currently encoded subblock's transofrm coefficients are not scanned last among the transform coefficients of the transform block according to the scan order, and the currently encoded subblock does not contain the predetermined non-zero coeffiicent (120*a*), encoding the suublock flag of the currently encoded subblock into the data stream wherein a signifcance flag for a lastly scanned transform coefficient inside the currently encoded subblock is to be inferred as indicating significance, if the significane flags for all transform coefficients inside the currently encoded subblock, which preceed the lastly scanned transform coefficient according to the scan order (122), indicate non-significance.

8. Encoder of clause 7, wherein the scan order traverses the subblocks (124) and the transform coefficients (120) within each subblock (124)

in case of the transform (102) selected for the transform block (100) being the identity transform oppositely compared to the case of the transform (102) selected for the transform block (100) not being the identity transform.

9. Encoder of clause 7 or 8, wherein the scan order traverses the subblocks (124) and the transform coefficients (122) within each subblock diagonally.

10. Encoder of any of clauses 7 to 9, configured to if the transform (102) selected for the transform block (100) is the identity transform, if the currently encoded subblock's transform coefficients are scanned last among the transform coefficients of the transform block (100) according to the scan order (122), not encode the subblock flag for the currently encoded subblock so that same is ti be inferred as assuming the second flag state, if the subblock flags for all subblocks (124) inside the transform block (100), which preceed the currently encoded subblock according to the scan order, assume the first flag state, and if the currently encoded subblock's transform coefficients are not scanned last among the transform coefficients of the transform block (100) according to the scan order (122), encoding the subblock flag for the currently encoded subblock from the data stream.

11. Encoder of any of clauses 7 to 10, configured to if the transform selected for the transform block is the identity transform, not encoding a signifcance flag for a lastly scanned transform coefficient inside the currently encoded subblock so that same is to be inferred as indicating significance, if the significane flags for all transform coefficients inside the currently encoded subblock, which preceed the lastly scanned transform coefficient according to the scan order, indicate non-significance.

12. Encoder of any of clauses 7 to 11, configured to if the transform selected for the transform block is not the identity transform, encoding the position of a perdetermined non-zero transform coefficient inside the transform block into the data stream in form of two coordinates indicative of a column and a row of the transform block, which contains the position.

13. Method for decoding a picture (12) from a data stream (14) in a block-based manner using prediction and using transform-based residual decoding with transform selection (107) among a set (106) of transforms including an identity transform and at least one non-identity transform, comprising, for a transform block (100), decoding (105), from the data stream (14), transform coefficients (120) of the transform block (100) using a scan order (122); and subblock flags, each subblock flag being associated with a corresponding subblock of an array of subblocks (124), into which the transform block (100) is subdivded, and which are traversed by the scan order (122) subblock by subblock, and indicating, when assuming a first flag state, that all transform coeffidients (120) within the corresponding subblock are inferred to be zero, wherein the method comprises if a transform (102) selected for the transform block (100) is the identity transform, decoding the transform coefficients (120) from the data stream (14) by starting with transform coefficients (120) inside a predetermined subblock (124*a*), which, according to the scan order (122), is traversed firstly among the subblocks (124), and after which, according to the scan order (122), the subblocks (124) of the array of sublocks (124), except the predetermined subblock (124*a*), are scanned completely, and decoding the subblock flag for a currently decoded subblock, and, if the subblock flag for the currently decoded subblock assumes the first flag state, inferring that the transform coefficients (120) inside the currently decoded subblock are zero, and if the subblock flag for the currently decoded subblock assumes a second flag state, decoding the transform coefficients (120) inside the currently decoded subblock from the data stream (14), and if the transform (102) selected for the transform block (100) is not the identity transform, decoding the transform coefficients (120) from the data stream (14) by decoding a position of a perdetermined non-zero transform coefficient (120*a*) inside the transform block (100) from the data stream (14), starting with the perdetermined non-zero transform coefficient (120*a*) with inferring that all transform coefficients preceeding the perdetermined non-zero transform coefficient (120*a*) in scan order (122) are zero, and deriving the subblock flag for a currently decoded subblock, and, if the subblock flag for the currently decoded subblock assumes the first flag state, inferring that the transform coefficients (120) inside the currently decoded subblock are zero, and if the subblock flag for the currently decoded subblock assumes a second flag state, decoding the transform coefficients (120) inside the currently decoded subblock from the data stream (14) with if the currently decoded subblock is scanned last among the subblcks (124) of the transform block (100) according to the scan order (122), inferring that the subblock flag for the the currently decoded subblock assumes the the second flag state, and decoding the signifance flag of all of the at least one or more transform coefficients (120) inside the currently decoded subblock from the data stream which follow the predetermined non-zero transform coefficient (120*a*) in scan order, if the predetermined non-zero transform coefficient (120*a*) is unequal to a last transform coefficient (120*b*) according to the scan order (122), and if the currently decoded subblock contains the predetermined non-zero coeffiicent (120*a*), inferring that the subblock flag for the the currently decoded subblock assumes the the second flag state, and decoding the signifcance flag of each transform coefficient inside the currently decoded subblock whhich follows, along the scan order (122), the predetermined non-zero transform coefficient (120*a*) and inferring that the signifacne flag of the predetermined non-zero transform coefficient (120*a*) indicates significace, and if the currently decoded subblock's transofrm coefficients are not scanned last among the transform coefficients of the transform block according to the scan order, and the currently decoded subblock does not contain the predetermined non-zero coeffiicent (120*a*), decoding the suublock flag of the currently decoded subblock from the data stream and inferring that a signifcance flag for a lastly scanned transform coefficient inside the currently decoded subblock indicates significance, if the significane flags for all transform coefficients inside the currently decoded subblock, which preceed the lastly scanned transform coefficient according to the scan order (122), indicate non-significance.

14. Method for encoding a picture (12) into a data stream (14) in a block-based manner using prediction and using transform-based residual coding with transform selection (117) among a set (106) of transforms including an identity transform and at least one non-identity transform, comprising, for a transform block (100), encoding (115), into the data stream (14), transform coefficients (120) of the transform block (100) using a scan order (122); and subblock flags, each subblock flag being associated with a corresponding subblock of an array of subblocks (124), into which the transform block (100) is subdivded, and which are traversed by the scan order (122) subblock by subblock, and indicating, when assuming a first flag state, that all transform coeffidients (120)

within the corresponding subblock are inferred to be zero, wherein the method comprises if a transform (102) selected for the transform block (100) is the identity transform, encoding the transform coefficients (120) into the data stream (14) by starting with transform coefficients (120) inside a predetermined subblock (124*a*), which, according to the scan order (122), is traversed firstly among the subblocks (124), and after which, according to the scan order (122), the subblocks (124) of the array of sublocks (124), except the predetermined subblock (124*a*), are scanned completely, and encoding the subblock flag for a currently encoded subblock, wherein, if the subblock flag for the currently encoded subblock assumes the first flag state, the transform coefficients (120) inside the currently encoded subblock are inferred to be zero, and if the subblock flag for the currently encoded subblock assumes a second flag state, the method comprises encoding the transform coefficients (120) inside the currently encoded subblock into the data stream (14), and if the transform (102) selected for the transform block (100) is not the identity transform, encoding the transform coefficients (120) into the data stream (14) by encoding a position of a perdetermined non-zero transform coefficient (120*a*) inside the transform block (100) into the data stream (14), starting with the perdetermined non-zero transform coefficient (120a) wherein all transform coefficients preceeding the perdetermined non-zero transform coefficient (120*a*) in scan order (122) are to be inferred to be zero, and deriving the subblock flag for a currently encoded subblock, wherein, if the subblock flag for the currently encoded subblock assumes the first flag state, the transform coefficients (120) inside the currently encoded subblock are to be inferred to be zero, and if the subblock flag for the currently encoded subblock assumes a second flag state, the comprises encoding the transform coefficients (120) inside the currently encoded subblock into the data stream (14) with if the currently encoded subblock is scanned last among the subblcks (124) of the transform block (100) according to the scan order (122) (i.e. the currently encoded subblock's transform coefficients are scanned last among the transform coefficients of the transform block according to the scan order), the subblock flag for the the currently encoded subblock being to be inferred as assuming the the second flag state, and encoding the signifance flag of all of the at least one or more transform coefficients (120) inside the currently encoded subblock into the data stream which follow the predetermined non-zero transform coefficient (120*a*) in scan order, if the predetermined non-zero transform coefficient (120*a*) is unequal to a last transform coefficient (120*b*) according to the scan order (122), and if the currently encoded subblock contains the predetermined non-zero coeffiicent (120*a*) (i.e. the position), the subblock flag for the the currently encoded subblock being to be inferred as assuming the the second flag state, and encoding the signifcance flag of each transform coefficient inside the currently encoded subblock whhich follows, along the scan order (122), the predetermined non-zero transform coefficient (120*a*) wherein the signifacne flag of the predetermined non-zero transform coefficient (120*a*) is to be inferred as indicating significace, and if the currently encoded subblock's transofrm coefficients are not scanned last among the transform coefficients of the transform block according to the scan order, and the currently encoded subblock does not contain the predetermined non-zero coeffiicent (120*a*), encoding the suublock flag of the currently encoded subblock into the data stream wherein a signifcance flag for a lastly scanned transform coefficient inside the currently encoded subblock is to be inferred as indicating significance, if the significane flags for all transform coefficients inside the currently encoded subblock, which preceed the lastly scanned transform coefficient according to the scan order (122), indicate non-significance.

15. Data stream having a picture encoded thereinot using a mthod according to clause 14.

16. A computer program for implementing any of the methods of clauses 13 and 14 when being executed on a computer or signal processor.

The invention claimed is:

1. A decoder configured to decode a picture from a data stream on a block by block basis, the data stream comprising a plurality of transform blocks to be decoded, each transform block being subdivided into a plurality of subblocks, wherein a subblock flag indicates whether transform coefficients in a respective subblock are all zero or not, and a significance flag indicates whether a respective transform coefficient is zero or not, the decoder comprising circuitry configured to:

determine a transform of a plurality of transforms to apply to a current transform block of the plurality of transform blocks to be decoded;

when the transform is an identity transform, if a current subblock of the plurality of subblocks is the last subblock scanned in the current transform block, according to a first scan order associated with the identity transform, and each subblock flag for each previously scanned subblock in the current transform block is zero, infer the subblock flag for the last scanned subblock is one, otherwise, decode the subblock flag for the current subblock from the data stream; and if the subblock flag for the current subblock is zero, infer that each transform coefficient of the current subblock is zero, and if the subblock flag for the current subblock is one, whether the subblock flag for the current subblock was decoded from the data stream or inferred, decode the significance flags for the current subblock from the bitstream except for a last scanned position of the current subblock, according to the first scan order, and if each significance flag preceding the last scanned position in the current subblock is zero, infer that the significance flag for the last scanned position of the current subblock is one; and when the transform is a non-identity transform, decode a position of a predetermined non-zero transform coefficient of the current transform block, according to a second scan order corresponding to the non-identity transform, different from the first scan order, and infer that each transform coefficient in the current subblock preceding the position of the predetermined non-zero transform coefficient, according to the second scan order, is zero, and if the current subblock is the last subblock scanned, according to the second scan order, or is the subblock containing the predetermined non-zero transform coefficient, infer the subblock flag for the current subblock is one, and decode any significance flags corresponding to transform coefficients of the current subblock following the position of the predetermined non-zero transform coefficient, according to the second scan order, otherwise, decode the subblock flag for the current subblock, and if the subblock flag for the current block is zero, infer that each transform coefficient of the current subblock is zero, and if the subblock flag for the current subblock is one, decode the significance flags for the current subblock from the bitstream except for the last scanned position of the current subblock, according to the second scan order, and if each significance flag preceding the last scanned position in the current subblock is zero, infer that the significance flag for the last scanned position of the current subblock is one.

2. The decoder of claim 1, wherein the first scan order traverses the plurality of subblocks of the current transform block and the transform coefficients of each subblock in the current transform block in an opposite direction to the second scan order.

3. The decoder of claim 1, wherein the first scan order and the second scan order traverse the plurality of subblocks of the transform block and the transform coefficients of each subblock diagonally.

4. The decoder of claim 1, configured to when the transform is the non-identity transform, decode the position of the predetermined non-zero transform coefficient of the transform block from the data stream comprising two coordinates indicative of a column and a row of the transform block.

5. The decoder of claim 1, wherein the number of significance flags corresponding to transform coefficients of the current subblock following the position of the predetermined non-zero transform coefficient is zero, one or higher.

6. A method for decoding a picture from a data stream on a block by block basis, the data stream comprising a plurality of transform blocks to be decoded, each transform block being subdivided into a plurality of subblocks, wherein a subblock flag indicates whether transform coefficients in a respective subblock are all zero or not, and a significance flag indicates whether a respective transform coefficient is zero or not, the method comprising:

determining a transform of a plurality of transforms to apply to a current transform block of the plurality of transform blocks to be decoded;

when the transform is an identity transform, if a current subblock of the plurality of subblocks is the last subblock scanned in the current transform block, according to a first scan order associated with the identity transform, and each subblock flag for each previously scanned subblock in the current transform block is zero, inferring the subblock flag for the last scanned subblock is one, otherwise, decoding the subblock flag for the current subblock from the data stream; and if the subblock flag for the current subblock is zero, inferring that each transform coefficient of the current subblock is zero, and if the subblock flag for the current subblock is one, whether the subblock flag for the current subblock was decoded from the data stream or inferred, decoding the significance flags for the current subblock from the bitstream except for a last scanned position of the current subblock, according to the first scan order, and if each significance flag preceding the last scanned position in the current subblock is zero, inferring that the significance flag for the last scanned position of the current subblock is one; and when the transform is a non-identity transform, decoding a position of a predetermined non-zero transform coefficient of the current transform block, according to a second scan order corresponding to the non-identity transform, different from the first scan order, and inferring that each transform coefficient in the current subblock preceding the position of the predetermined non-zero transform coefficient, according to the second scan order, is zero, and if the current subblock is the last subblock scanned, according to the second scan order, or is the subblock containing the predetermined non-zero transform coefficient, inferring the subblock flag for the current subblock is one, and decoding any significance flags corresponding to transform coefficients of the current subblock following the position of the predetermined non-zero transform coefficient, according to the second scan order, otherwise, decoding the subblock flag for the current subblock, and if the subblock flag for the current block is zero, inferring that each transform coefficient of the current subblock is zero, and if the subblock flag for the current subblock is one, decoding the significance flags for the current subblock from the bitstream except for the last scanned position of the current subblock, according to the second scan order, and if each significance flag preceding the last scanned position in the current subblock is zero, inferring that the significance flag for the last scanned position of the current subblock is one.

7. The method of claim 6, wherein the first scan order traverses the plurality of subblocks of the current transform block and the transform coefficients of each subblock in the current transform block in an opposite direction to the second scan order.

8. The method of claim 6, wherein the first scan order and the second scan order traverse the plurality of subblocks of the transform block and the transform coefficients of each subblock diagonally.

9. The method of claim 6, comprising when the transform is the non-identity transform, decoding the position of the predetermined non-zero transform coefficient of the transform block from the data stream comprising two coordinates indicative of a column and a row of the transform block.

10. The method of claim 6, wherein the number of significance flags corresponding to transform coefficients of the current subblock following the position of the predetermined non-zero transform coefficient is zero, one or higher.

11. A non-transitory computer-readable medium for implementing the method of claim 6 when being executed on a computer or signal processor.

12. A computer program product comprising program code portions for implementing the method of claim 6 when being executed on a computer or signal processor.

13. A datastream having a picture encoded therein for being decoded using a method according to claim 6.

* * * * *